United States Patent
Fleurence et al.

(10) Patent No.: US 10,632,906 B2
(45) Date of Patent: Apr. 28, 2020

(54) LIGHTING DEVICE INDICATING A CONFIGURATION STATE OF A VEHICLE SEAT

(71) Applicant: VALEO VISION, Bobigny (FR)

(72) Inventors: Thierry Fleurence, Bobigny (FR); Eric Stefura, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/718,514

(22) Filed: Sep. 28, 2017

(65) Prior Publication Data

US 2018/0086256 A1   Mar. 29, 2018

(30) Foreign Application Priority Data

Sep. 28, 2016 (FR) ...................................... 16 59199

(51) Int. Cl.
| | |
|---|---|
| *B60Q 3/233* | (2017.01) |
| *B60N 2/02* | (2006.01) |
| *B60N 2/58* | (2006.01) |
| *B60N 2/00* | (2006.01) |
| *B60Q 3/18* | (2017.01) |
| *B60Q 3/54* | (2017.01) |
| *B60Q 3/16* | (2017.01) |
| *B60Q 3/64* | (2017.01) |
| *B60Q 3/12* | (2017.01) |

(Continued)

(52) U.S. Cl.
CPC ............ *B60Q 3/233* (2017.02); *B60N 2/002* (2013.01); *B60N 2/02* (2013.01); *B60N 2/0244* (2013.01); *B60N 2/0248* (2013.01); *B60N 2/58* (2013.01); *B60Q 1/50* (2013.01); *B60Q 3/12* (2017.02); *B60Q 3/16* (2017.02); *B60Q 3/18* (2017.02); *B60Q 3/54* (2017.02); *B60Q 3/60* (2017.02); *B60Q 3/64* (2017.02); *B60Q 3/70* (2017.02); *B60Q 3/80* (2017.02); *F21V 5/04* (2013.01); *F21V 14/04* (2013.01); *G02B 6/0001* (2013.01); *F21Y 2115/10* (2016.08)

(58) Field of Classification Search
CPC . B60N 2/44; B60N 2/02; G03B 21/14; G03B 21/00; B60Q 1/00
USPC ........ 340/6.1; 353/13, 10, 12; 359/478, 634; 297/217.3, 344.13; 345/108
See application file for complete search history.

(56) References Cited

U.S. PATENT DOCUMENTS

| | | | | |
|---|---|---|---|---|
| 4,234,907 | A | * | 11/1980 | Daniel ................. A41D 27/085 139/420 R |
| 5,709,448 | A | * | 1/1998 | Jennings ................ G02B 6/001 362/156 |

(Continued)

FOREIGN PATENT DOCUMENTS

| | | |
|---|---|---|
| DE | 10 2012 013 550 A1 | 1/2013 |
| JP | 2011-121500 | 6/2011 |

OTHER PUBLICATIONS

French Preliminary Search Report dated May 24, 2017 in French Application 16 59199 filed on Sep. 28, 2016 (with English Translation of Categories of Cited Documents).

*Primary Examiner* — Nam V Nguyen
(74) *Attorney, Agent, or Firm* — Oblon, McClelland, Maier & Neustadt, L.L.P.

(57) ABSTRACT

Lighting device indicating a configuration state of a seat of a motor vehicle, the lighting device being arranged to illuminate at least one part of the seat as a function of at least one datum relating to the configuration state of this at least one part of a seat relative to a configuration instruction for a given user.

12 Claims, 1 Drawing Sheet

(51) Int. Cl.
 *B60Q 1/50* (2006.01)
 *B60Q 3/80* (2017.01)
 *B60Q 3/70* (2017.01)
 *B60Q 3/60* (2017.01)
 *F21V 5/04* (2006.01)
 *F21V 14/04* (2006.01)
 *F21V 8/00* (2006.01)
 *F21Y 115/10* (2016.01)

(56) References Cited

U.S. PATENT DOCUMENTS

| | | | | |
|---|---|---|---|---|
| 6,854,869 B1* | 2/2005 | Fernandez | ............ | A47C 7/725 297/184.17 |
| 7,036,936 B2* | 5/2006 | Hattori | ............... | B60R 11/0235 353/13 |
| 7,131,728 B2* | 11/2006 | Nambudiri | ............ | G02B 27/01 353/13 |
| 7,293,831 B2* | 11/2007 | Greene | ............... | B60N 2/02 297/217.6 |
| 7,490,853 B2* | 2/2009 | Stanley | ............... | B60N 2/002 180/273 |
| 7,831,319 B2* | 11/2010 | Browne | ............... | B60K 37/06 700/83 |
| 8,042,868 B2* | 10/2011 | Sakai | ............... | B60N 2/002 200/5 R |
| 8,162,519 B2* | 4/2012 | Salter | ............... | B60Q 3/54 362/488 |
| 8,248,219 B2* | 8/2012 | Sato | ............... | B60Q 9/00 340/425.5 |
| 8,256,945 B2* | 9/2012 | Choquet | ............... | B60Q 3/745 362/488 |
| 8,272,689 B2* | 9/2012 | Biaud | ............... | B60N 2/2812 297/250.1 |
| 9,200,796 B2* | 12/2015 | Ehrmann | ............... | F21V 33/00 |
| 9,290,146 B2* | 3/2016 | Breed | ............... | B60R 21/01536 |
| 9,505,344 B1* | 11/2016 | Bobo | ............... | B60N 2/58 |
| 9,771,003 B2* | 9/2017 | Kolich | ............... | B60N 2/64 |
| 9,802,535 B2* | 10/2017 | Line | ............... | B60Q 3/233 |
| 9,849,728 B2* | 12/2017 | Alfaro Fonseca | ...... | B60N 2/002 |
| 10,272,920 B2* | 4/2019 | Shikii | ............... | B60W 40/08 |
| 2005/0017842 A1* | 1/2005 | Dematteo | ............ | G07C 9/00309 340/5.72 |
| 2010/0066137 A1* | 3/2010 | Sakai | ............... | B60N 2/002 297/217.3 |
| 2010/0295670 A1 | 11/2010 | Sato et al. | | |
| 2014/0265478 A1 | 9/2014 | Schultz et al. | | |
| 2015/0197186 A1* | 7/2015 | Salter | ............... | B60Q 3/68 362/510 |
| 2015/0274068 A1* | 10/2015 | Falconi | ............... | B60N 2/60 297/217.6 |
| 2018/0105071 A1* | 4/2018 | Lange-Mao | ............ | B60N 2/0244 |

* cited by examiner

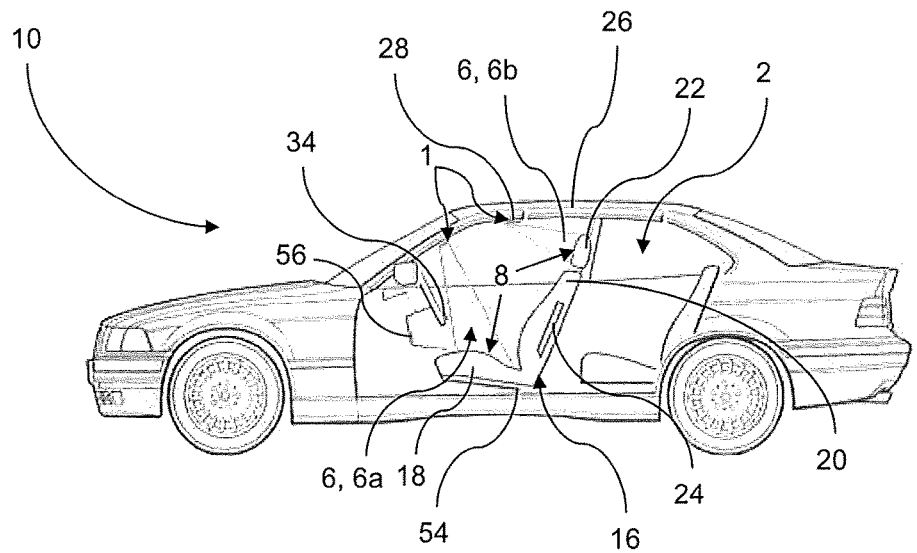
FIG.1
FIG.2
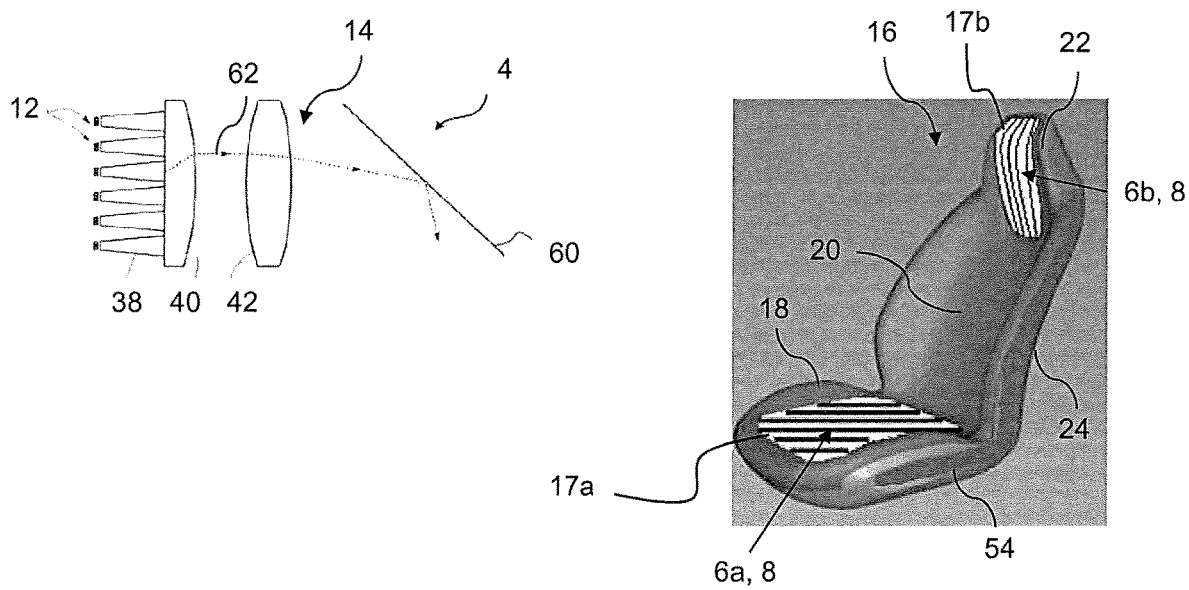
FIG.3

LIGHTING DEVICE INDICATING A CONFIGURATION STATE OF A VEHICLE SEAT

The area of the present invention is that of interior lighting of motor vehicles.

Motor vehicle seats may be configurable in order to adapt to the morphology of their occupants, in particular to obtain an optimal driving position. It is thus possible to modify the rake of the backrest, and/or the height of the seat base, and/or the distance of the seat base relative to the steering wheel, in order to be seated as well as possible in relation to the mirrors, steering wheel and windscreen. It is also possible to adjust the temperature of the seat, the position of the headrest or other elements.

Vehicle users have particular needs or preferences in terms of driving position in particular. Those who share a same vehicle must regularly, or even daily, change the configuration of their seat, whether this is a driver's seat or a passenger seat. This repeated change of configuration of the seat entails a time loss, and the possibility that the new position is not faithfully adapted to the desired driving position. An unsuitable driving position may prove dangerous since it modifies the driver's references and habits.

Other users may have particular needs. This is the case in particular for the disabled, those with reduced mobility, the elderly or children. These persons are not always able to adjust the seat before or after being seated. Adjustment of the conformity of the seat configuration by a third person may be a source of danger because of the environment. The same applies to the fitting of a booster cushion or child seat.

Seats may be adjusted manually via a set of levers arranged at various places on the seat and in the cab, or electrically via controls arranged on or next to the seat. Whatever the type of adjustment, it may be suitable for the user to know that the configuration of the seat complies with that desired.

The invention lies in this context and aims to propose a lighting device indicating the configuration state of a seat of a motor vehicle, the lighting device being arranged to illuminate at least one part of the seat as a function of data relating to the configuration state of this at least one part of a seat relative to a configuration instruction for a given user. The invention thus relates to a lighting device able to assume different characteristics as a function of the configuration state of a seat of a motor vehicle.

According to various characteristics of the invention, it may be provided that:

the configuration state comprises at least one non-conforming state and one conforming state, the illumination of the seat by the lighting device differing depending on the configuration state of the at least one part of the seat;

the configuration state comprises at least one intermediate configuration state, the intermediate configuration state being a state between the conforming state and the non-conforming state;

the lighting device comprises a control module configured to modify the illumination of the at least one part of the seat as a function of the identity of a user of the vehicle;

the configuration of the seat comprises the adjustment of a seat base, the rake of a backrest, of a headrest, the position of an armrest, adjustment of the height of a safety belt, the distance from a steering wheel, the firmness of the seat base or the backrest, adjustment of the part of the seat situated in the lumbar region of the user;

the lighting device comprises at least one projection means arranged in at least one part of the seat;

the lighting module(s) may be arranged in at least one element out of the following: the seat base, the backrest, the headrest, an armrest or the support of the seat base;

the at least one part of the seat in which the at least one projection means is arranged comprises either luminous fibers which form the seat covering, or a translucent and/or transparent portion which reveals the light beams emitted by devices integrated in the structure of the seat;

the lighting device comprises at least one projection means arranged in at least one structural element of the cab of the vehicle; this at least one structural element of the cab may in particular be a roof of the cab, a roof light, a door pillar, a steering wheel or a center console;

the passage of a seat from a non-configured state to a configured state is initiated by one of the following methods: timed programming, anticipated actuation, detection by the weight of the user, detection by camera or fingerprint or voice, detection by identification of the key or an element of the key, automatically or deliberately by a user, detection by a mobile means, in particular a mobile telephone, a smartphone or a tablet or any other mobile communication means.

The invention also concerns an assembly for configuring a seat of a motor vehicle, comprising at least one lighting device according to the above-mentioned characteristics.

The invention also concerns a seat of a motor vehicle comprising at least one integrated lighting device, i.e. housed in the thickness of the seat.

Finally, the invention concerns a method for indicating the configuration of the seat of a vehicle by illumination of all or part of the seat as a function of the configuration or development of the configuration of the seat. According to this aspect of the invention, at least one datum is acquired representative of the configuration or its development, and a subsequent step of configuration of the illumination of the seat as a function of this datum, and the implementation of the lighting method in a cab of the motor vehicle.

Further characteristics, details and advantages of the invention will arise more clearly from reading the description given below for information in connection with the drawings, in which:

FIG. 1 is a diagrammatic representation, from the side, of a motor vehicle in which the cab is equipped with a lighting device for indicating the configuration state of a seat according to a first embodiment of the invention, the side doors being here shown transparently to facilitate understanding of the figure;

FIG. 2 is a diagrammatic illustration of an embodiment of a projection means fitted to the lighting device of FIG. 1; and FIG. 3 is a perspective view of a seat comprising several zones of projection of information relating to the configuration state of corresponding seat parts.

Firstly, it should be noted that the figures present the invention in detail for the purpose of implementing the invention, said figures naturally being able to better define the invention where applicable.

A cab 2 of a motor vehicle 10 is equipped with at least one configurable seat 16 and at least one assembly for configuring this seat, which comprises in particular a lighting device 1 configured to give a luminous indication of the configuration state of all or part of the seat 16, and which may also comprise a system for controlling the seat configuration and a system for detecting the user of the seat.

The control system is configured firstly to issue control instructions sent to the means for adjusting the configuration of the seat 16 or one of its parts, these adjustment means being implemented to change the configuration of the seat 16 according to a user's preferences or instructions, and secondly to process data on the seat configuration, these data being received via sensors mounted in the seat 16. These data may be sent to the control system in real-time or sent on request from the control system.

The detection system comprises means for detecting a user in order to control the configuration of the seat as a function of the user and his preferences.

According to the invention, the system detects a user about to sit in a configurable seat 16. A configurable seat 16 is a seat 16 which may assume at least one initial configuration, namely the factory configuration or the configuration left by the last user, and a final configuration, namely the configuration desired by the user.

When the user is detected, a calculation module present in a control module determines whether the configuration of the seat 16 must be changed, and if so determines which part of the seat 16 must be configured, and what the final configuration should be, before initiating a sequence for changing the configuration of the seat 16.

The lighting device 1 is specific in that it comprises means 4 for projecting a light beam 6 configured to show information 8 to the driver and/or passenger seated in the front next to the driver, and/or to the rear seat passenger(s). The means 4 for projecting a light beam 6 may be configured to present information 8 to the driver and/or passenger when they are outside the vehicle 10. The projection means 4 may be controlled by one or more actuators as a function of instructions received by the control module.

The projection means 4 of the lighting device 1 will now be described.

The projection means 4 comprise at least one light source 12 and at least one associated optical device 14 for formatting the rays emitted by the light source 12.

The projection means 4 may also in some cases comprise a support for these components to allow their pivoting.

The control module is configured to generate control instructions for the light source 12 and control instructions for the optical device 14.

The light source 12 may be an incandescent bulb, one or more colored LEDs, where applicable of different colors, or white or RGB-type LEDs, or any other type of light source.

The optical device or devices 14 may be light guides, lenses, luminous fibers or textiles, or a reflector.

The projection means 4, one of their elements or their support, are mounted pivoting so as to be able to direct the rays emitted by the light source 12 and processed by the optical devices 14 according to the needs for presentation of information 8.

Two embodiments of the invention are distinguished below, which differ in that the lighting device 1 arranged to illuminate at least a part of the seat 16 functions with back projection from the interior of the seat 16, or in front projection from a structural element of the cab 2.

In a first embodiment of the invention, the lighting device 1 may be positioned in at least a part of the seat 16, in particular one of the elements of the seat 16 which are a seat base 18, a backrest 20, a headrest 22, an armrest 24, or a support 54 of the seat base 18. The lighting device 1 may be arranged over the entirety of an element or may be restricted to a portion thereof, for example the whole of an armrest 24 or merely the free end thereof. Preferably, the light beam 6 is visible from the outside of the vehicle 10, in particular through the window, the windscreen or the door when open, such that the information 8 can be seen as early as possible by the user.

In this first embodiment, a first variant is noted in which the optical device 14 is formed by a luminous fiber or textile, used to constitute fully or partly the part of the seat 16 which is to be illuminated, and a second variant according to which the optical device 14 is housed inside the seat 16 below the covering.

In the first variant, a light source 12 is arranged at one end of a corresponding luminous fiber. The light source 12 and the corresponding end of the fiber are housed in a part of the seat 16, in order to be protected from impacts and not to hinder the seating of the user.

In the second variant, sufficient light intensity is provided to shine through the fabric, or a transparent and/or translucent fabric zone is provided opposite which the optical device 14 is housed in the seat 16, and which reveals the light beams emitted by the devices integrated in the structure of the seat; the light beam 6 emitted by the projection means 4 composed of light sources 12 and optical devices 14 passes through the transparent and/or translucent zone.

It is possible to have one type of lighting device 1 arranged in one part of the seat 16, and another type of lighting device 1 arranged in another part of the seat 16, each lighting device 1 being able to be in a different luminous state depending on the configuration state of the part of the seat 16 to which it belongs.

In a second embodiment of the invention, the lighting device 1 may be positioned in at least one structural element of the cab 2 of the vehicle 10. Such a structural element may be a roof 26 of the cab 2, a roof light 28, a door pillar, the door itself, a steering wheel 34, a dashboard element, a central console 56, or a rear-view mirror, this list being given as a non-limitative example.

In this embodiment, the light source 12 is preferably one or more LEDs arranged singly, in a group or in series, but may be any type of light source.

In the same embodiment, the optical device or devices 14 are preferably light guides 38, lenses 40, 42 and/or reflectors 60, these optical devices being configured such that the light beam they help generate is oriented towards the part of the seat to be illuminated.

It is possible to have one lighting device arranged in one structural element of the cab 2 of the vehicle 10, and another lighting device arranged in another structural element of the cab 2, each lighting device being able to generate light beams 6 of different aspects depending on the configuration state of the part of the seat 16 it illuminates.

The variants presented in the two embodiments are in no way mutually exclusive. It is quite possible to have a first lighting device positioned in at least one part of the seat 16, and a second lighting device positioned in at least one of the structural elements of the cab 2.

The lighting device 1 is adjustable as a function of the user. Different users of the same vehicle 10 may choose a particular lighting sequence, one or more colors, a variation of intensity, a particular number of light beams 6, which information 8 shall be displayed, and any other modifiable characteristic of a light beam 6.

FIG. 2 illustrates an example of the projection means 4 configured to generate a light beam 6 illuminating at least one part of the seat. It is understood that this exemplary embodiment may be implemented more practically in the second variant, wherein the rays 62 emitted by the light sources 12 are processed optically by the optical devices 14, and in particular by a plurality of light guides 38, with advantageously one light guide 38 per light source 12, a lens 40 which is preferably common to all outlet diopters of the light guides 38, and where applicable an additional lens 42 arranged on the path of the rays leaving the lens 40 in order to concentrate the light beam 6. The rays 62 emitted by the light sources 12 may in this case be directed onto the part of the seat to be illuminated, or be directed towards an optical diversion means, for example a reflector 60, so as to be diverted towards this part of the seat 16; the presence of a reflector, in particular movable about a rotation axis, allows different orientations of the light rays, i.e. towards one part of the seat 16 or towards another part of the seat 16.

The various possible forms of the light beam 6 generated by the projection means 4 according to the invention will be described below, whether these means are integrated in the seat 16 or arranged in a structural element of the cab 2 at a distance from the seat 16, by describing several application cases.

The light beam 6 may in fact have various characteristics either in form, which may be influenced by the type of light sources 12 and optical devices 14 used, or in light intensity, color or—without this list being exhaustive—static or dynamic character.

According to the invention, at least one light beam 6 is intended to illuminate a part of a seat 16 as a function of the configuration state of this part of the seat 16. This may involve several possible arrangements.

A single light beam may be provided to illuminate a single part of the seat 16, and this light beam may be static or dynamic. As a variant, several light beams may be provided, with one light beam specifically dedicated to one part of the seat 16, or several light beams dedicated to a same part of the seat 16. In each of these arrangements, the light source or sources 12 and the optical device or devices 14 of the projection means 4 forming the light beam 6 may be controlled by actuators, in order to modify a characteristic of the light beam 6 as a function of the development in configuration of the corresponding part of the seat 16.

The intensity of the light beam 6 may be variable as a function of an instruction to control the intensity of power supplied to the light source 12, issued by the control module. The beam may have a high power or, on the contrary, be weaker and be closer to the effect which may be given by a conventional or subdued interior lighting. According to the invention, the intensity of the light beam 6 may, in particular, vary as a function of the configuration state of the part of the seat 16 to be illuminated. For example, it may be provided that when the configuration of the seat 16 is non-conforming, the light beam 6 has an intensity which is greater than a predefined value in order to draw the user's attention to the fact that the seat 16 is not yet in the correct configuration.

The light beam 6 may also assume a visible spectrum color or a plurality of colors from the spectrum. In the case of a plurality of light beams 6, it may be provided that the beams have a common color or each beam has a specific color as a function of the configuration state of the corresponding part of the seat 16. The color of the light beam 6 may vary as a function of an instruction to control the color of the rays emitted by the light source 12, the instruction being given by the control module. In particular, one or more RGB diodes may be used with an instruction to control each of the red, green and blue diodes. According to the invention, the color of the light beam may vary in particular as a function of the configuration state of the part of the seat 16 to be illuminated. As an example, it may be provided that when the configuration of the seat 16 is non-conforming, the light beam 6 has a red color to draw the user's attention to the fact that the seat 16 is not yet in the correct configuration.

A light beam 6 may illuminate a part seat 16 in static fashion, or illuminate the same part dynamically, in particular by the successive illumination of diodes arranged in this part of the seat 16.

In particular in the case where a plurality of light beams 6 is provided, dynamic lighting may be achieved by successive illumination of several parts of the seat 16; this may then take place discontinuously, i.e. the light beam 6 is interrupted between illuminating two parts of the seat 16, or be continuous by moving from one of the parts of the seat 16 to another.

The characteristics of the light beam 6 may be modified during configuration of the seat 16 in order to reflect the development of the configuration of the seat 16 or at least a part thereof, i.e. either a first initial configuration state, a second final configuration state, or an intermediate configuration state. The change in characteristic of the light beam 6 may be continuous in order to reflect the real-time development of the configuration of the seat 16, and reflect this transition via a plurality of intermediate configurations between the initial configuration and the final configuration of the seat 16, or the change may be stepped in stages, the light beam 6 changing whenever the configuration of the seat 16 reaches the predefined state.

In a variant embodiment, the intensity of the light beams 6 may be conditioned as a function of the external brightness, given that the illumination of specific zones would not be discerned by the user in full daylight. Information would thus be communicated to the control module from an exterior light sensor of the vehicle. On each sequence of changing the configuration of the seat 16, the control module refers to the light value determined by the corresponding sensor. If this light value exceeds a predefined threshold value, the intensity of the light beam or beams 6 may be increased in an attempt to display information 6 for the user, and the module waits for the next detection of a user entering the vehicle 10.

The information 8 concerns the configuration of the seat 16 of one of the users, and in particular the driver or front seat passenger next to the driver. The configuration of the seat 16 corresponds to one or more elements concerning the position and/or posture of a user. These elements include, without being exhaustive, the distance of the seat 16 relative to the steering wheel 13, the incline of the seat base 18, the height of the seat 16, the rake of the backrest 20, the incline and height of the headrest 22, the presence or absence of armrests 24, the firmness of the backrest 20, or the adjustment of the seat belt height. The adjustment means controlled by the control system are configured to modify one or other of these characteristics.

As has been specified, the seat 16 may assume at least two states, namely a first non-configured state for receiving the user, i.e. a non-conforming configuration state, and a second configured state for receiving the user, i.e. a conforming configuration state. The seat may also assume one or more intermediate states which reflect the development between the first and second states.

The seat 16 may develop from one of its configurations to the other following the detection of a user, either via a camera, a mobile device carried by the user, or a weight sensor integrated in seat 16.

The configuration of the seat 16 may, alternatively or additionally, be controlled by pre-programming, either by recurrent or exceptional timed programming or by remote control by the user.

Recurrent timed programming consists of defining a habitual user at a given time for certain days of the week, configuring the seat to the preferences of this user, and displaying information 8 intended to give an indication of the configuration of the seat 16 relative to the preferences of the defined user when the latter is detected close to the vehicle 10.

Exceptional timed programming consists of programming a specific configuration for a future event which is not repeated in time. Exceptional timed programming allows programming in the morning of a particular configuration for a specific user for the afternoon, without this configuration being repeated during the following days or weeks.

Finally, the user may spontaneously decide to use the vehicle 10 and request configuration of the seat 16 according to his preferences. The request may be formulated via a control interface available on a dedicated electronic device, or on a computer, a telephone or tablet belonging to the user. The user may then visually follow the configuration and only move towards the vehicle 10 once the seat 16 is arranged in accordance with his preferences.

The detection means of the detection system may in particular take the form of means for video detection or audio detection of the user, means for radio detection of a key or an identification element remotely, in particular via Bluetooth or RFID. The detection means may also comprise means for detecting the user's smartphone. The detection system may also comprise means of identifying fingerprints, retinal prints or any other type of print specific to each user.

The means for detecting the user, whatever the detection type selected, send a datum to the control system which initially associates a specific configuration of the seat 16 with a detected user, then determines the modifications to be made to the seat 16 in order to pass from the current configuration to the desired specific configuration, i.e. the final configuration.

FIG. 3 shows a configurable seat 16 with two support zones for specific information 17a, 17b. A first zone 17a corresponds to the seat base 18, and a second zone 17b corresponds to the headrest 22. Each of these zones may be defined by a surface of luminous fibers when the lighting device is integrated in the seat, or be defined by a projection zone on which a light beam may be projected from a lighting device mounted in a structural element of the cab at a distance from the seat. A first light beam 6a is produced by control of a lighting device associated with the seat base of the seat, and a second light beam 6b is produced by controlling a lighting device associated with the headrest of the seat. In the example illustrated, the first light beam 6a has a greater light intensity than the light intensity of the second light beam 6b, for example in order to notify the user that a configuration operation of the seat base is in progress, whereas it is completed for the headrest. As described above, this information could also be expressed by different colors of the two light beams 6a and 6b.

We will now describe cases of use of the device for indicating the configuration of a seat according to the invention, by describing at least one method of indicating the configuration of a seat 16 by illumination of all or part of the seat as a function of the configuration and/or the development of configuration of the seat.

During this method, at least one datum is acquired which is representative of the configuration of the seat 16 or the development of this configuration, and then a step of illuminating the seat 16 is performed as a function of this datum.

These two steps may advantageously be repeated several times. In particular, acquisition of a datum may be repeated several times in order to obtain a representative image of the configuration state of the seat 16, with a subsequent step of illuminating the seat 16 whenever the datum just acquired differs from the datum previously acquired, or when the difference between these is sufficiently great to justify an adjustment of the illumination.

The method may be used, simultaneously or not, for each of the configurable seats 16. This is in particular the case for the seats 16 in the front of the vehicle 10, wherein the seats 16 situated in the rear may be arranged in a bench which cannot be adjusted. However, it is quite possible, without leaving the context of the invention, to propose the same method and the same device for seats 16 other than those situated in the front.

The detection system is configured to detect the approach of a user carrying a key for the vehicle 10, via an RFID system. Variants may appear in usage cases, for example in the detection of the user. In particular, the user wishing to enter the vehicle 10 may place his hand on the handle or the opening zone of the door, and a fingerprint reader may identify the user and transmit this identification to the control module.

The control module associates this user identification with a desired seat configuration, and sends the data relating to the preferences of this user to the control system, which compares this final configuration to the data collected on the initial configuration state of the seat 16.

If the configuration of each part of the seat 16 conforms to the user's preferences, the control system communicates with the control module associated with the lighting device 1 for indicating the configuration state of the seat 16, and the control module is configured in this case to trigger the operation of the lighting device for indicating a configuration state of the seat, in order to reflect the correctly configured state of the seat 16 and display the corresponding information 8, for example via a plurality of light beams 6 of green color on each of the parts of the seat 16.

Otherwise, the control system communicates with the control module associated with the lighting device 1 for indicating the configuration state of the seat 16, so that said device generates information 8 on the parts of the seat 16 which do not conform to the user's wishes: for example, a plurality of light beams 6 of red color on each of the non-conforming parts of the seat 16. The user, on approaching, sees the seat 16 of his vehicle illuminated in red to indicate a non-conforming state. The information given to the user may change progressively as the configuration approaches the reference configuration. The color of the light beam may thus pass from red to orange and then to yellow, in order to indicate an ever-reducing difference between the seat configuration and the reference configuration. The light beam may also flash at a frequency dependent on this difference, for example faster as the configuration approaches the reference configuration.

Simultaneously, the control system triggers a sequence of modifying the configuration of at least part of the seat 16 by generating control instructions to the means for adjusting the configurable seat. During this modification sequence, the control system may at regular intervals verify the data relating to the configuration of the seat 16, and communicate with the control module so that the latter controls the operation of the lighting device in order to obtain one or more light beams 6 as a function of the configuration state of the seat. The red light beams 6 become progressively orange and then yellow, in order to indicate the approaching conformity. Once the seat 16 is in the final configuration i.e. conforms to the user's preferences, the control system may interrupt the modification sequence and communicate with the control module associated with the lighting device 1, so that the latter emits a beam 6 corresponding to information 8 of conformity, such as for example illumination of the entirety of the seat 16 with a broad and intense light beam 6 of green color, a beam which may concentrate and hence the intensity diminish gradually before disappearing.

The description above clearly explains how the invention may achieve the objects set, and in particular proposes a lighting device 1 which can give information 8 to a user on the fact that the seat is correctly configured, which is a guarantee of safety in particular for the driver of the vehicle.

Naturally, various modifications may be made by the person skilled in the art to the traffic aid device which has just been described as a non-limitative example, such that at least lighting means are implemented which are arranged to illuminate all or part of a seat, and these lighting means are controlled to reflect a configuration state of the seat of the occupant of the vehicle.

In any case, the invention is not limited to the embodiments specifically described in this document, and in particular extends to all equivalent means or any technically viable combination of these means.

The invention claimed is:

1. A lighting device indicating a configuration state of a seat in a vehicle, the lighting device comprising:
   a projector arranged in the seat, the projector being arranged to illuminate at least one part of the seat as a function of at least one datum relating to the configuration state of the at least one part of the seat relative to a configuration instruction for a given user, wherein the configuration state of the at least one part of the seat comprises at least one non-conforming state and one conforming state,
   a passage of the seat from the non-conforming state to the conforming state is initiated by detecting a weight of the user, and then, after detecting the weight of the user, the passage of the seat is indicated by modifying illumination of the at least one part of the seat as the seat progresses through an intermediate configuration state between the non-conforming state and the conforming state,
   the illumination of the seat by the projector of the lighting device differs depending on the configuration state of the at least one part of the seat, and
   the configuration state of the at least one part of the seat comprises adjustment of a seat base, of a rake of a backrest, of a headrest, of a position of an armrest, of a height of a safety belt, of a distance from a steering wheel, of firmness of the seat base or the backrest, or of a part of the seat situated in a lumbar region of the user; and
   a controller configured to modify the illumination of the at least one part of the seat as a function of an identity of a user of the vehicle.

2. The lighting device according to claim 1, wherein the projector is arranged in the seat base.

3. The lighting device according to claim 1, wherein the projector is arranged in one of the seat base, the backrest, the headrest, and the armrest or support of the seat base.

4. The lighting device according to claim 3, wherein an area of the seat in which the projector is arranged comprises either luminous fibers which form a covering of the seat, or a translucent and/or transparent portion which reveals light beams emitted by the projector integrated in a structure of the seat.

5. The lighting device according to claim 1, wherein an area of the seat in which the projector is arranged comprises either luminous fibers which form a covering of the seat, or a translucent and/or transparent portion which reveals light beams emitted by the projector integrated in a structure of the seat.

6. The lighting device according to claim 1, wherein the projector is arranged in the backrest of the seat.

7. The lighting device according to claim 6, wherein the projector is arranged in the headrest of the seat.

8. An assembly for configuring a seat of a motor vehicle comprising at least one lighting device according to claim 1.

9. A seat of a motor vehicle comprising at least one lighting device according to claim 2.

10. A method for indicating a configuration state of a seat of a vehicle, the method comprising:
    acquiring at least one datum representative of a configuration of the seat and/or its development;
    configuring illumination of all or part of the seat by a projector that is arranged in the seat as a function of the datum, the configuration state of at least one part of the seat comprising at least one non-conforming state and one conforming state;
    initiating a passage of the seat from the non-conforming state to the conforming state by detecting a weight of the user, and then, after detecting the weight of the user, indicating the passage of the seat by modifying illumination of the at least one part of the seat as the seat progresses through an intermediate configuration state between the non-conforming state and the configuration conforming state, wherein
    the illumination of the seat by the projector differs depending on the configuration state of the at least one part of the seat, and
    the configuration state of the at least one part of the seat comprises adjustment of a seat base, of a rake of a backrest, of a headrest, of a position of an armrest, of a height of a safety belt, of a distance from a steering wheel, of firmness of the seat base or the backrest, or of a part of the seat situated in a lumbar region of the user; and
    modifying the illumination of the at least one part of the seat as a function of an identity of a user of the vehicle.

11. The method according to claim 10, wherein the projector is arranged in the seat base.

12. The method according to claim 10, wherein the projector is arranged in the backrest of the seat.

* * * * *